(12) United States Patent
Hikata

(10) Patent No.: US 8,592,338 B2
(45) Date of Patent: Nov. 26, 2013

(54) CATALYST STRUCTURE AND METHOD OF MANUFACTURING CARBON NANOTUBE USING THE SAME

(75) Inventor: Takeshi Hikata, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 1488 days.

(21) Appl. No.: 10/590,011

(22) PCT Filed: Dec. 27, 2004

(86) PCT No.: PCT/JP2004/019538
§ 371 (c)(1),
(2), (4) Date: Aug. 21, 2006

(87) PCT Pub. No.: WO2005/082528
PCT Pub. Date: Sep. 9, 2005

(65) Prior Publication Data
US 2007/0172409 A1    Jul. 26, 2007

(30) Foreign Application Priority Data
Feb. 27, 2004   (JP) ................... 2004-052896

(51) Int. Cl.
*B01J 23/00* (2006.01)
*D01C 5/00* (2006.01)

(52) U.S. Cl.
USPC .......................... 502/313; 977/742; 423/447.3

(58) Field of Classification Search
USPC ................................. 977/742–752
See application file for complete search history.

(56) References Cited

U.S. PATENT DOCUMENTS

| 4,572,813 | A | 2/1986 | Arakawa |
| 6,146,227 | A | 11/2000 | Mancevski |
| 6,350,488 | B1 | 2/2002 | Lee et al. |
| 6,401,526 | B1 * | 6/2002 | Dai et al. ................. 423/447.3 |
| 6,858,197 | B1 * | 2/2005 | Delzeit ..................... 423/447.3 |
| 2003/0181328 | A1 * | 9/2003 | Hwang et al. ................ 502/325 |

FOREIGN PATENT DOCUMENTS

| JP | 60-54998 A | 3/1985 |
| JP | 02-008335 | 1/1990 |
| JP | 5-205542 A | 8/1993 |
| JP | 2001-20071 A | 1/2001 |

(Continued)

OTHER PUBLICATIONS

Zhu et al (Materials Research Bulletin 38 (2003) 1829-1834).*
dictionary.com definition of "wavelike" (retrieved on Jun. 30, 2009).*
Fan et al. Science. vol. 283. pp. 512-514. (Jan. 22, 1999).*

(Continued)

*Primary Examiner* — Michael Cleveland
*Assistant Examiner* — Joel Horning
(74) *Attorney, Agent, or Firm* — McDermott Will & Emery LLP

(57) ABSTRACT

A catalyst structure that allows a carbon nanotube having a desired shape and with larger length to be obtained in a stable manner and in high purity as well as a method of manufacturing a carbon nanotube using the same are provided. The present invention relates to a catalyst structure for use in manufacturing a carbon nanotube by means of vapor deposition of crystalline carbon, having a catalytic material that forms a ring or a whirl on its crystal growth surface, and further relates to a method of manufacturing a carbon nanotube using the same. Preferably, the catalyst structure is a columnar body with its upper surface serving as the crystal growth surface, where at least part of the side of the columnar body has a non-catalytic material that has substantially no catalytic activity with respect to the growth of the crystalline carbon.

5 Claims, 3 Drawing Sheets

(56) References Cited

FOREIGN PATENT DOCUMENTS

| | | |
|---|---|---|
| JP | 2002-526354 | 8/2002 |
| JP | 2002-255519 A | 9/2002 |
| JP | 2003-3337 A | 1/2003 |
| JP | 3421332 | 4/2003 |
| JP | 2003-206118 A | 7/2003 |
| WO | WO 99/65821 | 12/1999 |
| WO | WO 00/19494 | 4/2000 |
| WO | WO 2004/012932 A1 | 2/2004 |

OTHER PUBLICATIONS

Japanese Office Action, with English translation, issued in Japanese Patent Application No. 2004-052896, mailed Jul. 14, 2009.

Chinese Office Action, with English translation, issued in Chinese Patent Application No. 200480042011.0, mailed Oct. 23, 2009.

European Search Report issued in European Patent Application No. EP 04807893.5 dated Sep. 21, 2010.

Zheng Wei Pan et al., "Hierarchically ordered carbon tubes," Chemical Physics Letters 371 (2003) 433-437.

* cited by examiner

CATALYST STRUCTURE AND METHOD OF MANUFACTURING CARBON NANOTUBE USING THE SAME

RELATED APPLICATIONS

This application is the U.S. National Phase under 35 U.S.C. §371 of International Application No. PCT/JP2004/019538, filed on Dec. 27, 2004, which in turn claims the benefit of Japanese Application No. 2004-052896, filed on Feb. 27, 2004, the disclosures of which Applications are incorporated by reference herein.

TECHNICAL FIELD

The present invention relates to a catalyst structure for use in producing a carbon nanotube having a controlled shape and with larger length, and to a method of manufacturing a carbon nanotube using such a catalyst structure.

BACKGROUND ART

For example, Patent Document 1 proposes heating a mixture of a gaseous organic transition metal compound, a carrier gas and a gaseous organic compound to 800-1300° C. for producing a vapor deposition carbon fiber in suspension.

Patent Document 2 proposes a method for synthesizing a carbon nanotube including the steps of: forming a catalytic metal film on a substrate; etching the catalytic metal film to form separated catalytic metal nanoparticles; and supplying a carbon source gas into a thermochemical vapor deposition system to grow a carbon nanotube on each of the separated catalyst metal nanoparticles by thermochemical vapor deposition, thereby forming on the substrate a plurality of aligned carbon nanotubes perpendicular to the substrate, where the step of forming separated catalytic metal nanoparticles is performed by gas etching, where an etching gas, which is one selected from the group consisting of ammonia gas, hydrogen gas and hydride gas, is pyrolyzed to be used.

Patent Document 3 proposes a method of vapor-phase synthesizing a single-layer carbon nanotube by directing a hydrocarbon gas together with a carrier gas onto a base including a thermoresistant porous body carrying dispersed catalytic microparticles and utilizing pyrolysis of the hydrocarbon gas.

Patent Document 4 proposes a method of manufacturing a carbon nanotube on a metal surface using chemical vapor deposition by heating the metal and flowing toward it a gas which serves as a carbon source, characterized in that the metal surface has fine asperities provided by oxide microcrystals on the metal surface.

Unfortunately, conventional methods such as those in Patent Documents 1 to 4 produced carbon-containing by-products such as amorphous carbon or graphite in addition to desired carbon nanotubes. They also produced carbon nanotubes with large variation in their diameter, making it difficult to manufacture homogeneous carbon nanotubes in a stable manner.

Carbon nanotubes may have varying diameters due to the variation in size of catalyst particles. When catalyst particles are formed by a chemical method such as pyrolysis, it is difficult to control their shape, resulting in a morphological variation among them. Aggregation of catalyst particles may also cause a morphological variation. Further, varying growth rate of carbon crystals on catalyst particles also tends to cause varying shapes of the resulting carbon nanotubes.

In addition, the use of particulate catalyst does not allow easy production of a carbon nanotube with larger length.

Patent Document 1: Japanese Patent Laying-Open No. 60-54998
Patent Document 2: Japanese Patent Laying-Open No. 2001-20071
Patent Document 3: Japanese Patent Laying-Open No. 2002-255519
Patent Document 4: Japanese Patent No. 3421332

DISCLOSURE OF THE INVENTION

Problems to be Solved by the Invention

The present invention solves the above problem. An object of the present invention is to provide a catalyst structure that allows a carbon nanotube having a desired shape and with larger length to be produced in a stable manner and in high purity, as well as a method of manufacturing a carbon nanotube using the same.

Means for Solving the Problems

The present invention relates to a catalyst structure for use in manufacturing a carbon nanotube of crystalline carbon by means of vapor deposition, which includes a catalytic material that forms a ring or a whirl on a crystal growth surface.

Preferably, the catalyst structure of the present invention is a columnar body with its upper surface serving as the crystal growth surface, at least part of the side of the columnar body having a non-catalytic material which has substantially no catalytic activity with respect to the growth of crystalline carbon.

Preferably, the non-catalytic material includes one or more selected from the group consisting of Ag, Au, Ru, Rh, Pd, Os, Ir and Pt.

In the present invention, the catalytic material is preferably made of one or more selected from the group consisting of Fe, Co, Mo and Ni, and the non-catalytic material is made of Ag and/or an Ag containing alloy. Preferably, the catalytic material has a multilayer structure.

Preferably, at least the crystal growth surface of the catalytic material of the present invention is oxidized.

Preferably, the crystal growth surface of the catalytic material of the catalyst structure may also have a wavelike ring configuration.

Further, the present invention relates to a method of manufacturing a carbon nanotube, the method using a catalyst structure having a catalytic material that forms a ring or a whirl on a crystal growth surface, the crystal growth surface being contactable with a feedstock gas for vapor deposition of crystalline carbon on the crystal growth surface.

In the above method, the carbon nanotube is preferably produced at a temperature not higher than a deformation temperature of the non-catalytic material. The "deformation temperature" herein means a temperature at which the non-catalytic material is thermally deformed and thus makes it impossible to produce a desired carbon nanotube.

The catalyst structure of the present invention may be in the form of an assembly of a plurality of such catalyst structures, where a throughhole may be provided between the catalyst structures.

The feedstock gas for producing the carbon nanotube is preferably flown in a direction perpendicular to the crystal growth surface.

Preferably, a plurality of catalyst structures are disposed such that a non-catalytic material is in contact with at least part of the side of the resulting columnar assembly, and the variation in the cross section of catalytic material measured on the crystal growth surface among the plurality of catalyst structures is not more than CV10%.

Preferably, the crystal growth surface of the catalyst structure of the present invention undergoes a sputtering. Preferably, the sputtering is performed using cluster ion beam or ultrashort pulse laser.

Preferably, the catalytic material in the present invention undergoes a reactivation employing one or more of chemical polishing, physical polishing and sputtering.

Effects of the Invention

By using a catalyst structure with a specific shape, the present invention allows a carbon nanotube having a desired shape and with larger length to be manufactured in a stable manner and in high purity.

Figure 1A:
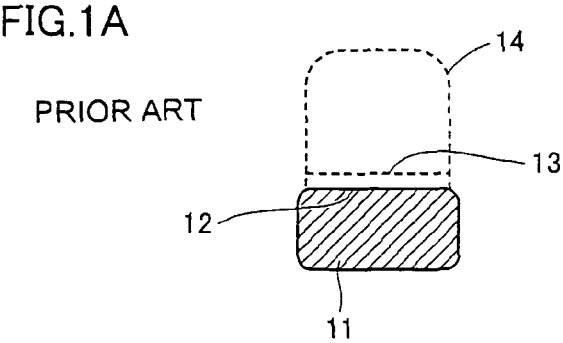
FIG. 1A shows an example of a conventional catalyst.

DESCRIPTION OF THE REFERENCE CHARACTERS 11 particulate catalyst; 12, 22 crystal growth surface; 13, 23 crystalline carbon; 14, 24 carbon nanotube; 21, 61 catalyst structure; 25 inner side; 26 outer side; 31, 41, 51 catalytic material; 32, 42, 52, 62 non-catalytic material; 63 through-hole; 71, 81 electric furnace; 72, 82 quartz tube; 73, 83 catalytic base; 84 catalytic base support.

BEST MODES FOR CARRYING OUT THE INVENTION

Figure 1B:
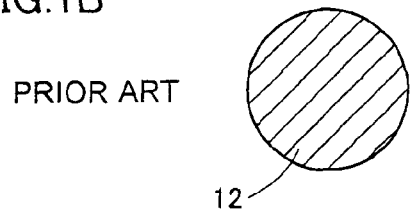
FIG. 1B shows the example of the conventional catalyst.

As shown in FIGS. 1A-1B, a particulate catalyst 11 has a solid crystal growth surface 12 according to the conventional art. The use of such a particulate catalyst 11 for manufacturing carbon nanotubes results in crystalline carbon 13 growing over the entire crystal growth surface 12, which results in a carbon nanotube 14 with a cap portion. A method using a particulate catalyst 11 does not allow easy control of the diameter, particularly the inner diameter, of a carbon nanotube, nor does it allow easy production of a carbon nanotube with larger length.

The present invention is characterized in that a catalyst having a ring-shaped or whirly crystal growth surface may be in contact with a carbon containing feedstock gas for vapor deposition of crystalline carbon on the crystal growth surface to produce a carbon nanotube. The present invention allows a carbon nanotube to be produced that reflects the size and configuration of the crystal growth surface of the catalytic material, for example a carbon nanotube with a cross section that reflects a multilayer structure in the case of a multilayer structure catalytic material. Preferably, the catalyst structure of the present invention is a columnar body, where the crystal growth surface, i.e. the upper surface of the columnar body, may be an even surface so as to produce a carbon nanotube with even diameter. Further, by having a central region of the crystal growth surface that is made of other materials than the catalytic material, a carbon nanotube may be manufactured without a closed cap portion on its tip and the length of the carbon nanotube may be increased.

Preferably in the present invention, the catalyst structure is a columnar body with its upper surface serving as the crystal growth surface, where at least part of the side of the columnar body has a non-catalytic material that has substantially no catalytic activity with respect to the growth of crystalline carbon, such that the non-catalytic material prevents the crystalline carbon from being spread in the direction of the crystal growth surface during crystal growth, which allows crystals to be grown in a controlled direction, thereby enabling producing a carbon nanotube with more homogeneous geometry.

Figure 2A:
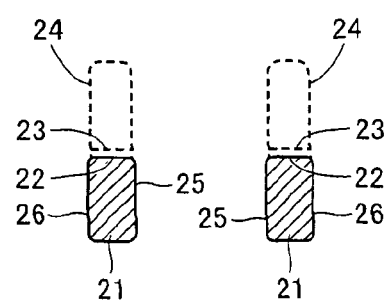
FIG. 2A shows an example of a catalyst structure according to the present invention.
Figure 2B:
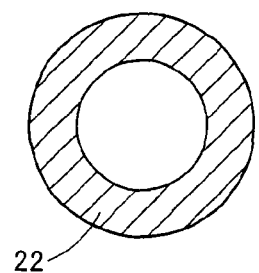
FIG. 2B shows the example of the catalyst structure according to the present invention.
Figure 2C:
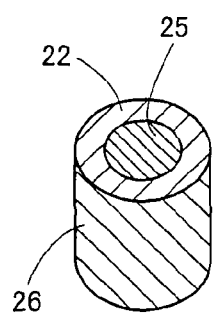
FIG. 2C shows the example of the catalyst structure according to the present invention.

As shown in FIGS. 2A to 2C, a catalyst structure 21 of the present invention is in the form of a columnar body where the catalytic material is ring-shaped on crystal growth surface 22, although the catalytic material may also be whirly on the crystal growth surface. The manufacture of a carbon nanotube using catalyst structure 21 can produce a carbon nanotube 24 that reflects the geometry of crystal growth surface 22.

Preferably, catalyst structure 21 is shaped as a pipe having a side as shown in FIGS. 2A to 2C. Catalyst structure 21 having a ring-shaped cross section on its crystal growth surface may have, on at least part of inner and outer surfaces 25 and 26, a non-catalytic material which has substantially no catalytic activity with respect to the growth of crystalline carbon 23, which would effectively reduce the variation in the shape of carbon nanotube 24 due to the spreading, for example, of the growing carbon nanotube in the direction of crystal growth surface 22 during the growth of carbon nanotube 24, allowing a carbon nanotube to be manufactured with even outer and inner diameters.

Figure 3:
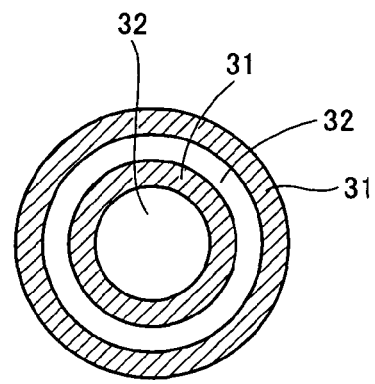
FIG. 3 shows a typical crystal growth surface of a catalyst structure according to the present invention.
Figure 4:
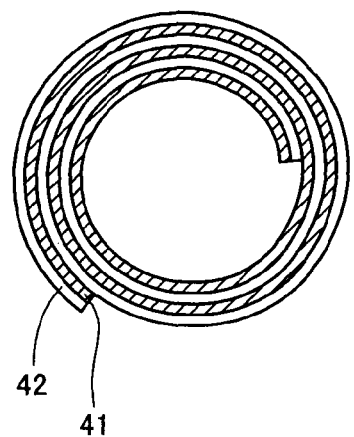
FIG. 4 shows a typical crystal growth surface of a catalyst structure according to the present invention.
Figure 5:
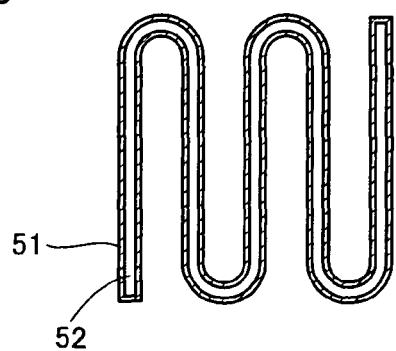
FIG. 5 shows a typical crystal growth surface of a catalyst structure according to the present invention.

The geometry of a catalyst structure according to the present invention is not limited to those as in FIGS. 3 to 5 and may be any one with a ring-shaped or whirly crystal growth surface. "Ring-shaped" used herein refers to any catalytic material having a crystal growth surface in a closed shape and is not limited to a circle.

The crystal growth surface of a catalyst structure as shown in FIG. 3 has a multilayered ring configuration with alternate catalytic and non-catalytic materials 31 and 32. The use of a catalyst structure as shown in FIG. 3 may produce a multilayer carbon nanotube with a desired geometry by adjusting the innermost and outermost diameters of the multilayered ring configuration on the crystal growth surface, as well as the width of the catalytic and non-catalytic materials, and the like.

The crystal growth surface of a catalyst structure as shown in FIG. 4 has a whirly configuration made of catalytic and non-catalytic materials 41 and 42. The use of a catalyst structure as shown in FIG. 4 may produce a carbon nanotube having a whirly cross section.

Further, the crystal growth surface of a catalyst structure as shown in FIG. 5 has a wavelike ring configuration where a catalytic material 51 surrounds a wavelike non-catalytic material 52. The use of a catalyst structure as shown in FIG. 5 may produce a carbon nanotube with a wavelike ring-shaped cross section.

Thus, the present invention allows a carbon nanotube to be manufactured having a desired shape by varying the shape of the catalytic material on the crystal growth surface. The diameter for the ring or whirl configurations on the crystal growth surface is not limited to a particular one, and the diameter of the ring or whirl may be selected in accordance with a desired diameter of the carbon nanotube.

The feedstock gas used in growing a carbon nanotube in the present invention may be: a hydrocarbon-based gas such as ethylene gas, acetylene gas; an alcohol-based gas such as methyl alcohol, ethyl alcohol; or other gases generally in use for manufacturing carbon nanotubes. An alcohol-based gas, capable of producing carbon nanotubes at lower temperatures, may be preferred when the catalytic and non-catalytic materials are made of materials with relatively low deformation temperatures, for example.

The catalytic material of the present invention may be a material generally in use for manufacturing carbon nanotubes and may be Fe, Co, Mo, Ni or an alloy containing them, of which only one or a combination of two or more may be used. Among them, Fe or Co or Fe—Co alloy materials are suitable since they do not form an alloy with Ag and do not alter their quality as a catalyst.

The non-catalytic material of the present invention has substantially no catalytic activity with respect to the growth of crystalline carbon, and may preferably be a precious metal such as Ag, Au, Ru, Rh, Pd, Os, Ir, Pt or an alloy containing such precious metals. Only one of them or a combination of two or more may be used. Among them, Ag and Ag containing alloys are suitable since they are relatively low-cost, easy to handle and chemically stable. Ag containing alloys include Ag—Pd alloys, Ag—Pt alloys and the like.

The deformation temperature of the non-catalytic material is preferably higher than the temperature at which the carbon nanotubes are produced. This will reduce the deformation of the non-catalytic material during crystal growth and allows a carbon nanotube to be produced with a homogeneous geometry.

Preferably in the present invention, a combination of a catalytic material and a non-catalytic material exhibits little risk of loss of the catalyst geometry due to formation of an alloy or reaction, for example, caused by a contact between them. Such a combination may be, for example: the combination of an oxide for the catalytic material and Ag or an Ag containing alloy for the non-catalytic material; the combination of a nitride for the catalytic material and Ag or an Ag containing alloy for the non-catalytic material, and the like.

A catalyst structure of the present invention needs to be prepared in a very small geometry on the order of nanometers in accordance with a desired diameter of the carbon nanotube. The method for preparing a catalyst in a very small geometry is not. limited to a particular one and includes, for example: repeated extrusion, wiredrawing and fitting of pipes or sheets of catalytic material to reduce the diameter to the order of nanometers; using photolithography to form a fine pattern of catalytic material on a substrate, and the like.

Figure 6:
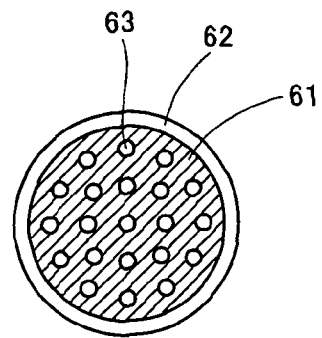
FIG. 6 shows a crystal growth surface of a catalytic base formed by a plurality of catalyst structures.

The present invention may also suitably provide a catalytic base of a columnar assembly formed by a plurality of catalyst structures with their crystal growth surfaces facing the same direction, thereby allowing efficient manufacturing of a great number of carbon nanotubes. As shown in FIG. 6, a catalytic base may preferably include a non-catalytic material 62 on the side of the assembly of catalyst structures 61 to prevent crystalline carbon from being spread in the direction of the crystal growth surface, thereby allowing a carbon nanotube with a homogeneous geometry to be manufactured with improved production efficiency. Preferably, the catalytic base also includes a tunnel-like throughhole 63 within it. When the feedstock gas is flown in a direction substantially perpendicular to the crystal growth surface, the feedstock gas is passed through the throughhole to prevent turbulence of the feedstock gas near the catalytic base, thereby allowing a carbon nanotube to be produced with substantially no loss of or variation in its geometry.

The variation in the cross section of the catalytic material measured on the crystal growth surface among the catalyst structures forming the catalytic base is preferably not more than 10% in CV. A variation in the cross section in CV of not more than 10% provides uniform shape among the catalytic materials in the catalytic base, which ensures geometrical homogeneity of resulting carbon nanotubes. The cross section may be calculated by means of, for example, image analysis based on the observed morphology in scanning tunneling microscopy (STM).

To provide clean catalytic material exposed on the crystal growth surface or to provide an even surface, the present invention may provide a surface treatment employing, for example, mechanical polishing or using ion beam such as cluster ion beam, laser such as ultrashort pulse laser, or employing chemical etching using oxygenated water or other chemical agents.

Further, at least the crystal growth surface of the catalytic material is preferably oxidized by, for example, heat treatment in oxygen atmosphere, thereby further improving the efficiency in producing carbon nanotubes.

When the use of a catalyst structure of the present invention to manufacture carbon nanotubes has caused a reduction in the catalytic activity of the catalytic material, the crystal growth surface may be reactivated by one or more of chemical polishing, physical polishing and sputtering to restore good catalytic activity for the crystal growth surface. Thus, once a catalyst structure has been prepared, it can be reused through reactivation of the crystal growth surface, resulting in reduced manufacturing cost of carbon nanotubes.

Figure 7:
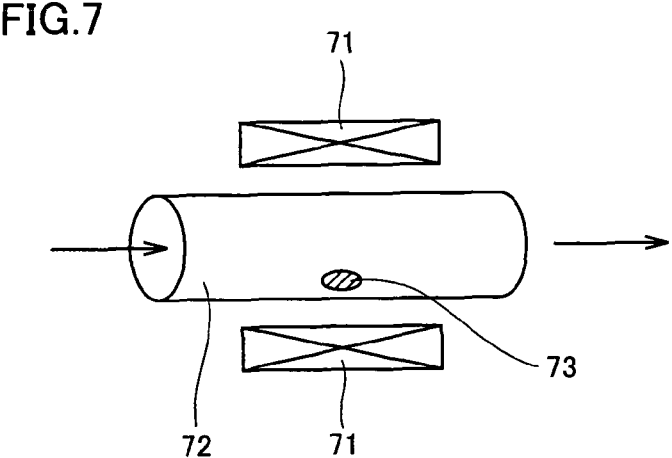
FIG. 7 shows one example of an apparatus for manufacturing a carbon nanotube.

Carbon nanotubes may be manufactured using a catalyst structure of the present invention in the following manner:

An example of an apparatus for manufacturing a carbon nanotube as shown in FIG. 7 includes an electric furnace 71 that serves as a heating device, and a quartz tube 72 including a gas introduction/evacuation system, a growth temperature control system, a vacuum control system and a gas flowmeter, in which a catalytic base 73 is placed. A feedstock gas such as methyl alcohol or ethyl alcohol, together with a carrier gas such as argon or nitrogen is flown in the direction indicated by the arrows to produce a carbon nanotube on the crystal growth surface of catalytic base 73.

Figure 8:
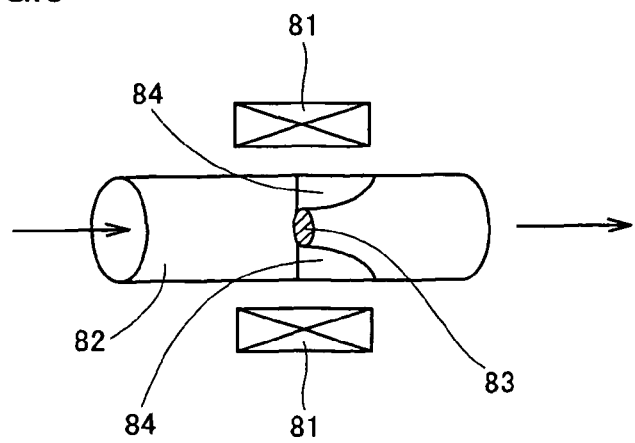
FIG. 8 shows another example of an apparatus for manufacturing a carbon nanotube.

Another example of an apparatus for manufacturing a carbon nanotube as shown in FIG. 8 includes an electric furnace 81 that serves as a heating device, and a quartz tube 82 including a gas introduction/evacuation system, a growth temperature control system, a vacuum control system and a gas flowmeter, in which a catalytic base 83 is placed. Catalytic base 83 is provided with many throughholes. A catalytic base support 84 is placed around catalytic base 83. A feedstock gas and a carrier gas are flown in the direction indicated by the arrows to produce a carbon nanotube on the crystal growth surface of catalytic base 83.

In the FIG. 8 example, the crystal growth surface of catalytic base 83 is substantially perpendicular to the direction in which the feedstock gas is flown. This minimizes the influence of the flow of the feedstock gas on the grown carbon nanotube, such that it tends to grow in a stable manner in a direction perpendicular to the crystal growth surface. The FIG. 8 example also reduces turbulence of the feedstock gas near catalytic base 83 due to the presence of catalytic base support 84, such that the carbon nanotube tends to grow in a yet more stable manner.

The temperature at which carbon nanotubes are produced is not limited to a particular one and may be selected in accordance with, for example, the properties of the used catalytic or non-catalytic materials or the type of the feedstock gas, and may be around 500-900° C., for example.

The apparatus for manufacturing a carbon nanotube for use in the present invention may be provided with a mechanism for supplying a refinement gas, for example, to refine produced carbon nanotubes.

Carbon nanotubes manufactured using the catalyst structure of the present invention has a homogeneous geometry and larger length, and thus can be suitable for a variety of applications including, for example, electronic circuitry, high-strength composites, electric wire materials, and cushions.

EXAMPLES

The present invention will now be described in more detail referring to non-examples.

Example 1

(1) Fabrication of Catalytic Base

An Fe (iron) pipe with an outer diameter of 50 mm and an inner diameter of 30 mm was introduced into an Ag (silver) pipe with an outer diameter of 60 mm and an inner diameter of 50 mm, and an Ag rod with a diameter of 30 mm was introduced into the Fe pipe. The combined metal material underwent wiredrawing until it had an outer diameter of 1.2 mm to provide a wire 1.

Wire 1 was cut into segments each with a length of 1 meter which were then bundled together, with which an Ag pipe with an outer diameter of 60 mm and an inner diameter of 50 mm was filled. The resulting material underwent wiredrawing until it had an outer diameter of 1.2 mm to provide a wire 2.

The step of producing a wire 2 from a wire 1 was repeated to ultimately provide an assembly made of a plurality of catalyst structures bundled together having Fe with an outer diameter of about 10 nm and an inner diameter of about 6 nm.

The assembly was cut into segments each with a length of 10 mm and their circular cross section that was to be a crystal growth surface was polished by abrasive before surface treatment was conducted by cluster ion beam so as to expose a portion of Fe on the crystal growth surface to fabricate a catalytic base. A square area of the crystal growth surface with a side of 1 μm which was randomly selected in the resulting catalytic base was observed by scanning tunneling microscopy (STM), and the cross section of catalytic material for each catalyst structure was calculated and the variation in the cross section was determined using the equation below. The result was a variation in the cross section of the catalytic material on the crystal growth surface of not more than 10% in CV (%).

CV(%)=standard deviation of all measures/average of all measures×100

(2) Manufacture of Carbon Nanotubes

The catalytic base provided as above was used to manufacture carbon nanotubes in a manufacturing apparatus as in FIG. 7. The catalytic base, being in a quartz boat, was put into a quartz tube, and argon gas was flown while the temperature inside the electric furnace was set to 600° C., at which temperature carbon nanotubes were produced. Thereafter, the supply of argon was stopped and, with the pressure in the quartz tube reduced by a vacuum pump, ethyl alcohol vapor was flown into the quartz tube. As a result, carbon fibers were visible to the eye and carbon nanotubes were observed as growing on the crystal growth surface of the catalytic base. An observation of the resulting carbon nanotubes by transmission electron microscopy (TEM) showed that substantially no by-product such as amorphous carbon or graphite had been produced.

The catalytic base was removed from the quartz tube and, after an observation of the crystal growth surface, was introduced back again into the quartz tube to attempt to produce carbon nanotubes, and substantially no new carbon nanotubes were produced. However, production of carbon nanotubes was observed when the crystal growth surface of the removed catalytic base had been mechanically polished and treated by cluster ion beam to expose catalytic material before the catalytic base was introduced back into the quartz tube to produce carbon nanotubes.

Example 2

(1) Fabrication of Catalytic Base

An iron-cobalt (Fe—Co) alloy pipe with an outer diameter of 50 mm and an inner diameter of 20 mm was introduced into a silver-palladium (Ag—Pd) alloy pipe with an outer diameter of 100 mm and an inner diameter of 50 mm, and a silver-palladium (Ag—Pd) alloy rod with a diameter of about 20 mm was introduced into the Fe—Co alloy pipe. The combined metal material underwent extrusion and wiredrawing until it had an outer diameter of 1 mm to provide a wire 1.

Wire 1 was cut into segments each with a length of 1 meter which were then bundled together, with which an Ag pipe with an outer diameter of 100 mm and an inner diameter of 80 mm was filled. The resulting material underwent wiredrawing until it had an outer diameter of 5 mm to provide a wire 2.

An aluminum (Al) rod with a diameter of 40 mm was introduced into an Ag pipe with an outer diameter of 50 mm and an inner diameter of 40 mm, which underwent wiredrawing until it had an outer diameter of 5 mm to provide a wire Al.

Wire 2 and wire Al were cut into segments each with a length of 1 meter, which were then bundled together such that wires 2 and wires Al were evenly mixed. An Ag pipe with an outer diameter of 100 mm and an inner diameter of 80 mm was filled therewith, which underwent wiredrawing until it had an outer diameter of 1 mm to provide a wire 3.

Wire 3 was cut into segments each with a length of 1 meter that were then bundled together, with which an Ag pipe with an outer diameter of 100 mm and an inner diameter of 80 mm was filled, which then underwent wiredrawing until it had an outer diameter of about 10 mm to fabricate an assembly of a plurality of catalyst structures bundled together having Fe—Co alloy with an outer diameter of about 25 nm and an inner diameter of about 12 nm.

The assembly was cut into segments each with a length of about 1 mm, and their cross section that is to be a crystal growth surface was polished by abrasive until it had a length of 0.1 mm. Al was then eluted in an aqueous solution of potassium hydroxide to form throughholes with a diameter of 40 μm.

The crystal growth surface was polished by buffing material and was etched by femtosecond laser so as to expose a portion of Fe—Co alloy on the crystal growth surface. Further, the crystal growth surface was treated using cluster ion beam so as to fabricate a catalytic base as shown in FIG. 6.

(2) Manufacture of Carbon Nanotubes

The catalytic base provided as above was used to manufacture carbon nanotubes in a manufacturing apparatus as in FIG. 8. A catalytic base and a catalytic base support were placed in a quartz tube and fixed in such a way that substantially all the gas flow was passed through throughholes in the catalytic base.

Argon gas was flown while the temperature in the electric furnace was set to 700° C. Thereafter, the supply of argon was stopped and, with the pressure in the quartz tube reduced by a vacuum pump, methyl alcohol vapor was flown into the quartz tube. As a result, carbon fibers were visible to the eye and carbon nanotubes were observed as growing on the crystal growth surface of the catalytic base. An observation by transmission electron microscopy (TEM) showed that substantially no by-product such as amorphous carbon or graphite had been produced.

Example 3

(1) Fabrication of Catalytic Base

An Fe pipe with an outer diameter of 50 mm and an inner diameter of 45 mm was introduced into an Ag pipe with an outer diameter of 60 mm and an inner diameter of 50 mm, and an Ag pipe with an outer diameter of 45 mm and an inner diameter of 40 mm was introduced into the Fe pipe and a nickel-cobalt (Ni—Co) alloy pipe with an outer diameter of 40 mm and an inner diameter of 35 mm was introduced into the second Ag pipe, and an Ag rod with a diameter of 35 mm was introduced into the Ni—Co alloy pipe. The resulting combined metal material underwent wiredrawing until it had an outer diameter of 1.2 mm to fabricate a wire 1.

Wire 1 was cut into segments each with a length of 1 meter that were then bundled together, with which an Ag pipe with an outer diameter of 60 mm and an inner diameter of 50 mm was filled. The resulting material underwent wiredrawing until it had an outer diameter of 1.2 mm to fabricate a wire 2. The step of producing a wire 2 from a wire 1 was repeated to eventually provide an assembly of a plurality of catalyst structures bundled together, where the Fe had an outer diameter of about 10 nm and an inner diameter of about 8 nm and the Fe—Co alloy had an outer diameter of about 6 nm and an inner diameter of about 4 nm.

The catalytic base was cut into segments each with a length of 10 mm and their cross section that is to be a crystal growth surface was polished by abrasive. Surface treatment was then conducted using cluster ion beam so as to expose a portion of Fe and a portion of Fe—Co alloy on the crystal growth surface, and the crystal growth surface was etched by a solution containing hydrogen peroxide and ammonium hydroxide to provide a catalytic base.

(2) Manufacture of Carbon Nanotubes

The catalytic base fabricated as above was used to manufacture a carbon nanotubes in a manufacturing apparatus shown in FIG. 7. The catalytic base in a quartz boat was put into a quartz tube, and argon gas was flown while the temperature in the electric furnace was set to 800° C. Thereafter, the supply of argon gas was stopped and, with the pressure within the quartz tube reduced by a vacuum pump, ethyl alcohol vapor was flown into the quartz tube. As a result, carbon fibers were visible to the eye and carbon nanotubes were observed as growing on the crystal growth surface. An observation by transmission electron microscopy (TEM) showed that substantially no by-product such as amorphous carbon or graphite had been produced.

Example 4

(1) Fabrication of Catalytic Base

An iron-nickel-molybdenum (Fe—Ni—Mo) alloy pipe with an outer diameter of 50 mm and an inner diameter of 30 mm was introduced into a silver-platinum (Ag—Pt) alloy pipe with an outer diameter of 60 mm and an inner diameter of 50 mm, and a silver-gold (Ag—Au) alloy rod with a diameter of 30 mm was introduced into the Fe—Ni—Mo alloy pipe. The combined metal material underwent wiredrawing until it had an outer diameter of 1.2 mm to fabricate a wire 1.

Wire 1 was cut into segments each with a length of 1 meter that were then bundled together, with which an Ag pipe with an outer diameter of 60 mm and an inner diameter of 50 mm was filled. The resulting material underwent wiredrawing until it had an outer diameter of 1.2 mm to fabricate a wire 2.

The step of producing a wire 2 from a wire 1 was repeated to ultimately provide an assembly of a plurality of catalyst structures bundled together where the Fe—Ni—Mo alloy pipe had an outer diameter of about 10 nm and an inner diameter of about 6 nm.

The resulting assembly was cut into segments each with a length of 1 meter and their cross section that is to be a crystal growth surface was polished by abrasive. Surface treatment was then conducted by etching so as to expose a portion of Fe—Ni—Mo alloy on the crystal growth surface. Heat treatment was then conducted in oxygen atmosphere at a temperature of 800° C.

The assembly underwent further wiredrawing until it was reduced to two-thirds in diameter and was cut into segments each with a length of 10 mm, with the polished surface being exposed on an end. A cluster ion beam treatment was then conducted to provide a catalytic base.

(2) Manufacture of Carbon Nanotubes

The catalytic base fabricated as above was used to manufacture carbon nanotubes in a manufacturing apparatus shown in FIG. 7. The catalytic base in a quartz boat was put into a quartz tube, and argon gas was flown while the temperature in the electric furnace was set to 850° C. Thereafter, the supply of argon gas was stopped and, with the pressure in the quartz tube reduced by a vacuum pump, ethyl alcohol vapor was flown into the quartz tube. As a result, carbon fibers were visible to the eye and carbon nanotubes were observed as growing on the crystal growth surface. An observation by transmission electron microscopy (TEM) showed that substantially no by-product such as amorphous carbon or graphite had been produced.

Example 5

(1) Fabrication of Catalytic Base

An Fe sheet and an Ag sheet with a thickness of 1 mm each was tightly wrapped around an Ag rod with a diameter of 10 mm leaving as little gap as possible, which was then introduced into an Ag pipe with an outer diameter of 60 mm and an inner diameter of 50 mm, again leaving as little gap as possible.

The combined metal material underwent wiredrawing until it had an outer diameter of 1.2 mm to fabricate a wire 1.

Wire 1 was cut into segments each with a length of 1 meter that were then bundled together, with which an Ag pipe with an outer diameter of 60 mm and an inner diameter of 50 mm was filled. The resulting material underwent wiredrawing until it had an outer diameter of 1.2 mm to fabricate a wire 2.

The step of producing a wire 2 from a wire 1 was repeated to ultimately provide an assembly of a plurality of catalyst structures bundled together with the whirly Fe having an innermost diameter of about 5 nm.

The resulting assembly was cut into segments each with a length of 10 mm and their cross section that is to be a crystal growth surface was polished by abrasive. Surface treatment was then conducted using cluster ion beam so as to expose a portion of Fe on the crystal growth surface to provide a catalytic base.

(2) Manufacture of Carbon Nanotubes

The catalytic base fabricated as above was used to manufacture carbon nanotubes in a manufacturing apparatus shown in FIG. 7. The catalytic base in a quartz boat was put into a quartz tube, and argon gas was flown while the temperature in the electric furnace was set to 700° C. Thereafter, the supply of argon gas was stopped and, with the pressure in the quartz tube reduced by a vacuum pump, ethyl alcohol vapor was flown into the quartz tube. As a result, carbon fibers were visible to the eye and carbon nanotubes were observed as growing on the crystal growth surface. An observation by transmission electron microscopy (TEM) showed that substantially no by-product such as amorphous carbon or graphite had been produced.

Example 6

(1) Fabrication of Catalytic Base

Within an Ag rod with a diameter of 10 mm, an Fe—Ag rod was embedded that is made of a combined sheet of Fe and Ag having a thickness of 1 mm and having a wavelike cross section as shown in FIG. 5 to fabricate a combined metal rod, where the combined sheet of Fe and Ag was an Ag sheet entirely covered by Fe.

The combined metal rod underwent wiredrawing until it had an outer diameter of 1 mm to fabricate a wire 1. Wire 1 was cut into segments each with a length of 1 meter that were then bundled together, with which an Ag pipe with an outer diameter of 60 mm and an inner diameter of 50 mm was filled. The resulting material underwent wiredrawing until it had an outer diameter of 1.2 mm to provide a wire 2.

The step of producing a wire 2 from a wire 1 was repeated to ultimately provide an assembly of a plurality of catalyst structures bundled together with the Fe sheet having a thickness of about 2 nm.

The resulting assembly was cut into segments each with a length of 10 mm and their cross section that is to be a crystal growth surface was polished by abrasive. Surface treatment was then conducted using cluster ion beam so as to expose a portion of Fe on the crystal growth surface to provide a catalytic base.

(2) Manufacture of Carbon Nanotubes

The catalytic base fabricated as above was used to manufacture carbon nanotubes in a manufacturing apparatus as shown in FIG. 7. The catalytic base in a quartz boat was put into a quartz tube, and argon gas was flown while the temperature in the electric furnace was set to a temperature at which carbon nanotubes were to be produced (500° C). Thereafter, the supply of argon gas was stopped and, with the pressure in the quartz tube reduced by a vacuum pump, ethyl alcohol vapor was flown into the quartz tube. As a result, carbon fibers were visible to the eye and carbon nanotubes were observed as growing on the crystal growth surface. An observation by transmission electron microscopy (TEM) showed that substantially no by-product such as amorphous carbon or graphite had been produced.

Comparative Example 1

Carbon nanotubes were produced in a similar manner to Example 1 except that the catalyst structure of Example 1 was replaced by a catalytic material with an alumina base carrying Fe microparticles with an average size of about 10 nm produced by pyrolysis of ferrocene. Although the production of carbon nanotubes was observed, a great amount of by-product such as amorphous carbon or graphite was produced as well. Moreover, an observation of the Fe particles by transmission electron microscopy (TEM) and an evaluation of the variation in the particle size by image analysis showed that a viewed square area with a side of 1 μm that was arbitrarily selected had a large variation of 200% or more in CV (%).

Comparative Example 2

Carbon nanotubes were grown in a similar manner to Example 2 except that the catalytic base of Example 2 was replaced by a catalytic material with an alumina base carrying Fe microparticles with an average size of about 7 nm produced by pyrolysis of ferrocene. Although the production of carbon nanotubes was observed, a great amount of by-product such as amorphous carbon or graphite was produced as well.

Comparative Example 3

Carbon nanotubes were grown in a similar manner to Example 3 except that the catalytic base of Example 3 was replaced by a catalytic material with an alumina base carrying Fe microparticles with an average size of about 10 nm produced by pyrolysis of ferrocene. Although the production of carbon nanotubes was observed, a great amount of by-product such as amorphous carbon or graphite was produced as well.

Comparative Example 4

Carbon nanotubes were grown in a similar manner to Example 4 except that the catalytic base of Example 4 was replaced by a catalytic material with an alumina base carrying Fe microparticles with an average size of about 10 nm produced by pyrolysis of ferrocene. While the production of carbon nanotubes was observed, a great amount of by-product such as amorphous carbon or graphite was produced as well.

Comparative Example 5

Carbon nanotubes were grown in a similar manner to Example 5 except that the catalytic base of Example 5 was replaced by a catalytic material with an alumina base carrying Fe microparticles with an average size of about 10 nm produced by pyrolysis of ferrocene. Although the production of carbon nanotubes was observed, a great amount of by-product such as amorphous carbon or graphite was produced as well.

Comparative Example 6

Carbon nanotubes were grown in a similar manner to Example 6 except that the catalytic base of Example 6 was replaced by a catalytic material with an alumina base carrying Fe microparticles with an average size of about 10 nm produced by pyrolysis of ferrocene. Although the production of carbon nanotubes was observed, a great amount of by-product such as amorphous carbon or graphite was produced as well.

The above demonstrates that the use of a catalyst structure according to the present invention allows stable manufacturing of a carbon nanotube with larger length with substantially no by-product such as amorphous carbon or graphite, by providing a catalytic material that is hollow on the crystal growth surface.

It should be understood that the disclosed embodiments and examples above are, in all respects, by way of illustration only and are not by way of limitation. The scope of the present invention is set forth by the claims rather than the above description and is intended to cover all the modifications within a spirit and scope equivalent to those of the claims.

INDUSTRIAL APPLICABILITY

The present invention allows a carbon nanotube having a desired shape and with larger length to be manufactured in a stable manner and in high purity.

The invention claimed is:

1. An assembly of a plurality of catalyst structures for use in manufacturing carbon nanotubes of crystalline carbon by means of vapor deposition, wherein the catalyst structure is shaped as a pipe with its even upper surface serving as a crystal growth surface, the catalyst structure includes a catalytic material that forms a ring corresponding to a carbon nanotube on the crystal growth surface, and at least part of a side of said structure shaped as a pipe has a non-catalytic material with substantially no catalytic activity with respect to a growth of said crystalline carbon.

2. The assembly of a plurality of catalyst structures according to claim 1, wherein said non-catalytic material is made of one or more selected from the group consisting of Ag, Au, Ru, Rh, Pd, Os, Ir and Pt.

3. The assembly of a plurality of catalyst structures according to claim 1, wherein said catalytic material is made of one or more selected from the group consisting of Fe, Co, Mo and Ni, and said non-catalytic material is made of Ag and/or an Ag containing alloy.

4. The assembly of a plurality of catalyst structures according to claim 1, wherein said crystal growth surface has a multilayer structure with catalytic and non-catalytic material.

5. The assembly of a plurality of catalyst structures according to claim 1, wherein at least said crystal growth surface of said catalytic material is oxidized.

* * * * *